United States Patent [19]

Scharton

[11] Patent Number: 5,262,813
[45] Date of Patent: Nov. 16, 1993

[54] IMPACT TRIGGERING MECHANISM FOR A CAMERA MOUNTED IN A VEHICLE

[76] Inventor: Terry D. Scharton, 1102 Stanford St., Santa Monica, Calif. 91403

[21] Appl. No.: 15,526

[22] Filed: Feb. 9, 1993

[51] Int. Cl.⁵ .......................................... G03B 17/38
[52] U.S. Cl. ...................................... 354/266; 354/76
[58] Field of Search ................ 354/266, 76; 352/132, 352/174

[56] References Cited

U.S. PATENT DOCUMENTS

| | | |
|---|---|---|
| 2,876,688 | 3/1959 | Lave .................... 352/132 |
| 2,879,349 | 3/1959 | Thompson . |
| 2,888,530 | 5/1959 | Horton . |
| 3,332,060 | 7/1967 | Liljequist . |
| 3,407,667 | 10/1968 | Doeringsfeld . |
| 3,836,738 | 9/1974 | Baland . |
| 4,734,725 | 3/1988 | Bierman ................ 354/76 |
| 5,011,118 | 4/1991 | Husby et al. . |
| 5,134,255 | 7/1992 | Tetrault et al. . |

Primary Examiner—Monroe H. Hayes
Attorney, Agent, or Firm—Thomas I. Rozsa; Dong Chen

[57] ABSTRACT

The present invention is an impact triggering mechanism for a camera mounted on a rear-view mirror of a vehicle. The impact triggering mechanism provides a unidirectional mechanical output in response to inertial forces from any horizontal direction. Upon sudden impact or deceleration an inertia member connected to the camera depresses the shutter release button on the camera, which the button actuates the shutter in the camera and takes a photographic picture.

24 Claims, 3 Drawing Sheets

IMPACT TRIGGERING MECHANISM FOR A CAMERA MOUNTED IN A VEHICLE

BACKGROUND OF THE INVENTION

1. Field of the Invention

The present invention relates to the field of cameras. More particularly, the present invention relates to an impact triggering mechanism for a conventional camera mounted on a rear view mirror of a vehicle.

2. Description of The Prior Art

Generally, when taking a picture, personal attention is required to take a photographic picture of an object. When a vehicle collision occurs instantly, there is no way to manually take a picture at the instant an accident has occurred. An impact actuated inertial switch is required to trigger a camera.

In the prior art inertial switch category, various devices employ spring biased movable masses to open or close an electrical circuit or do mechanical work when the device is subjected to a sudden acceleration change. The typical impact sensor utilizes a movable mass that is biased to a normal position by compressed springs or magnetic attraction. The movable mass is often shaped in the form of a spherical or metal ball and is constrained to move through a closed chamber against the restraining force of the biasing means upon receiving an inertial force from the proper direction. The following prior art references are relevant to the field of the present invention.

1. U.S. Pat. No. 5,134,255 issued to Tetrault et. al. on Jul. 28, 1992 for "Miniature Acceleration Switch" (hereafter the "Tetrault Patent").

2. U.S. Pat. No. 5,011,182 issued to Husby et al. on Apr. 30, 1991 for "Velocity Change Sensor With Contact Retainer" (hereafter the "Husby Patent").

3. U.S. Pat. No. 3,836,738 issued to Baland on Sep. 17, 1974 for "Impact Switch With Inertia Operated Toggle Linkage Actuator Mechanism" (hereafter the "Baland Patent").

4. U.S. Pat. No. 3,407,667 issued to Doeringsfeld on Oct. 29, 1968 for "Omnidirectional Inertial Trigger Apparatus" (hereafter the "Doeringsfeld Patent").

5. U.S. Pat. No. 3,332,060 issued to Liljequist on Jul. 18, 1967 for "Vehicle Deceleration Signalling Apparatus" (hereafter the "Liljequist Patent").

6. U.S. Pat. No. 2,888,530 issued to Horton on May 26, 1959 for "Impact Responsive Camera For Autombiles" (hereafter the "Horton Patent").

7. U.S. Pat. No. 2,879,349 issued to Thompson on Mar. 24, 1959 for "Safety Switch" (hereafter the "Thompson Patent").

The Tetrault Patent discloses a miniature acceleration electrical switch. It relates to electrical acceleration switches which have a mass movable in a housing against a spring bias in response to an applied acceleration. The miniature acceleration switch is responsive to a relatively small axial acceleration in order to close normally open contacts in the switch, in the presence of large laterally directed accelerations on the switch. It includes a hollow cylindrical casing closed at one end. Its other end is closed by a header having an insulated axial lead wire extending inwardly from the casing, and an electrically conductive ring secured peripherally to the casing. The casing has an internally conical guide sleeve which includes a freely rollable massive ball. A piston in the guide sleeve carries a contact member spaced by an expanded coil spring from the lead wire. The piston moves axially against the spring bias such that the contact member contacts the lead wire to close the normally open circuit switch.

The Husby Patent discloses a velocity change sensor with contact retainer. It relates to an accelerometer for sensing velocity changes particularly suited for passenger restraint systems in a motor vehicle for deploying an air bag. It includes a housing with contact blades and a contacting element. The contacting element is arranged to move toward the contact blades when a deceleration exceeding a threshold level is sensed. The contact retainer is provided to set the blades in a preselected position so that the blades are contacted by the contacting element simultaneously thereby improving the response time of the accelerometer. The contact blades are connected serially in an electrical circuit comprising a battery and an actuating mechanism. The actuating mechanism controls and deploys one or more air bags.

The Baland Patent discloses an inertia switch assembly utilized with an electrical circuit. the inertia responsive switch includes an over center linkage system, switch terminals operatively arranged with the linkage system and effective to move between open and closed positions, and an inertia member operatively connected to the linkage system so as to effectuate an opening or closing of the switch terminals when the inertia responsive member moves relative to the linkage system upon impact or high deceleration of the switch. The switch is sensitive to uniaxial impacts. The switch closes to complete a circuit effective to actuate a transmitter that emits a signal. The switch has special utility in an automatic crash signal device for aircraft.

The Doeringsfeld Patent discloses an omnidirectional acceleration sensor that will provide a unidirectional mechanical output. It includes a frame, a pivot pin, an arm member, a coil spring and a spherical ball in a cup. When an upward inertial force is received, the spherical ball will tend to move with the force in a direction away from the frame. The spherical ball will force the arm member to pivot about a pin in a clockwise direction. Similarly, a lateral force causes the ball to move out of the cup so that the arm pivots. The inertial force results in a mechanical movement of both ends of the arm member that can be utilized to perform useful work. The device is specially designed for a munitions fuse.

The Liljequist Patent discloses an inertia actuated electrical switching device and system responsive to changes in deceleration of a vehicle for varying the amount of light emitted from its rear warning lights. The deceleration sensitive arrangement is used to vary the current flow in an electrical circuit, which is a type utilizing a relatively freely movable mass forming an electrical bridge between two terminals in the circuit. The electrical circuit includes an elongate track, a mass being bias movable relative thereto in response to changes in velocity, and electrical resistance arranged so as to vary the electrical resistance interposed in the circuit dependent upon the relative position between the track and the mass.

The Horton Patent discloses a switch of impact type in an electrical circuit. It includes a base of a dielectric material, a permanent magnet which is a horse-shoe design, a steel ball, and a dish with the steel ball located within the dish. The steel ball is kept between the poles of the permanent magnet by the magnetic lines of the force between the poles. The magnetic attraction of the steel ball to the poles is intense enough to hold the steel ball in place. Upon impact, the steel ball would be thrown from its position in the center of the dish against the ring encircling the dish, and therefore the steel ball would be in contact with both the dish and the ring. The steel ball contacting both the dish and the ring would close the circuit. The intended, but not claimed, application of this device is the operation of a camera mounted in a vehicle. The switch would energize an electrical circuit causing an electromagnet to depress the push-button of the camera which actuates the shutter in the camera. The switch is mounted remotely from the camera and the camera is mounted in back of the vehicle.

The Thompson Patent discloses an electrical safety switch. The safety switch serves to interrupt an electrical circuit in a vehicle, airplane or the like, in the event of an accident or impact. The safety switch includes a movable metal ball that is adapted to be moved from a predetermined position upon impact so that an electrical circuit will be interrupted.

Most of the prior art inertial switch patents are designed for use with an electrical circuit. It will be desirable to eliminate the electrical output and rely entirely upon mechanical functions for impact triggering of a vehicle camera.

None of the prior art mechanical inertial switches are suitable for impact triggering of a vehicle camera. Most of the mechanical inertial switches require a very large impact for triggering, such as that associated with munitions or an aircraft impacting the ground at high velocities. Another category of inertial switches, mostly electrical, are designed to activate automobile air bags upon severe impacts. These are particularly designed to operate above some high threshold and to avoid false alarms. A vehicle camera trigger should be sensitive to relatively small impacts and a few false alarms are of little consequence.

The major design problem for a mechanical inertial trigger for a vehicle camera is that the trigger must provide a relatively large actuation force, in excess of one pound to depress the camera shutter release button, but must be capable of activation by relatively small impact loads, from any horizontal direction, on the order of several ounces.

In addition, a vehicle camera mechanical impact trigger should be designed for convenient location and mounting in the vehicle to facilitate servicing and manual operation by the vehicle occupants, while not interfering with other vehicle operation and usage.

SUMMARY OF THE INVENTION

The present invention is an impact triggering vehicle camera. Many times accidents occur without any witnesses around, and oftentimes each driver always blames the other driver for the accident. The primary objective of the present invention is to provide a means to operate a conventional camera whereby a photographic picture will be taken automatically when a vehicle collision occurs.

The preferred embodiment is a mechanical inertial trigger mechanism mounted on top of a mounting box in which a conventional disposable panoramic camera is placed inside of the mounting box and which mounting box is attached to a rear-view mirror of a vehicle. The apparatus has a supporting frame, a sliding weight, a strong spring to depress the camera shutter release button, and a pivoted lever acting between the sliding weight and spring. The present invention is capable of providing an actuation force in excess of one to two pounds which is the force required to depress the shutter release button of commercially available disposable cameras. Yet the device is sensitive to small (as low as 4 g's) accelerations or decelerations in any direction in the horizontal plane (where g is a standard unit equal to that due to the earth's gravity $g \approx 9.8$ mg.m/s$^2$). The trigger mechanism will be responsive to a sudden impact from another vehicle, but will normally remain inactive during average jostling and jarring of the vehicle due to the road condition.

It has been discovered, according to the present invention, that the impact triggering mechanism can be conveniently mounted onto a conventional disposable panoramic camera and be responsive to sudden impact as produced by a collision between two vehicles.

It has additionally been discovered, according to the present invention, that the impact triggering mechanism can be used without electrical circuits.

It has further been discovered, according to the present invention, that a mechanical lever mechanism can be utilized to balance the large required spring force with a small restraining force acting on a sliding weight.

It has also been discovered, according to the present invention, that if the impact triggering vehicle camera is mounted on the rear-view mirror of a vehicle, it will provide a photographic picture of the collision, the traffic light status, the license plates, the position of the vehicles relative to each other and the road, all at the instant of the collision.

It has further been discovered, according to the present invention, that the camera may be conveniently mounted in a box attached to the rear-view mirror and that the camera may be readily removed for conventional applications.

It is therefore an object of the present invention to provide an impact triggering mechanism, so that it can be responsive to a sudden impact such as the one produced by a collision between two vehicles.

It is an additional object of the present invention to provide an impact triggering mechanism without using electrical circuits, so that it can rely entirely upon mechanical functions for operating a camera.

It is a further object of the present invention to provide an impact trigger mechanism for a camera which is mounted on the rear-view mirror of a vehicle, so that it can record the collision, the traffic light status, the license plate and the position of the vehicles relative to each other and the road, at the instant of the collision and also be accessible for conventional usage.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
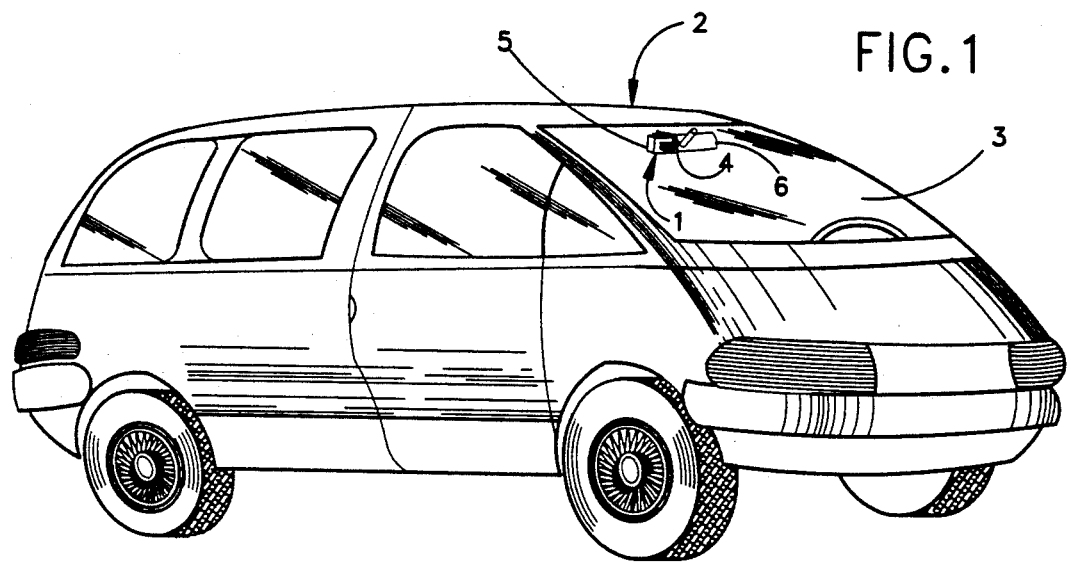
FIG. 1 is a perspective view of the present invention impact triggering camera apparatus mounted on a rear-view mirror of a vehicle.

Referring to FIG. 1, there is shown a perspective view of a vehicle 2 and the present invention impact triggering camera apparatus 1, which is mounted to a rear-view mirror 6 of the vehicle 2 (which may be a truck, a bus, a car, or any other type of vehicle).

Figure 2:
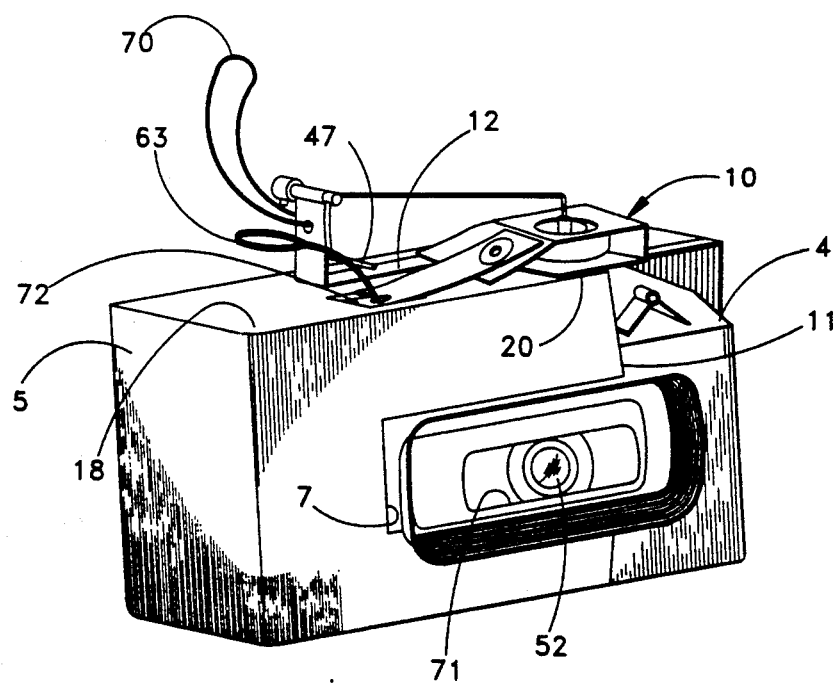
FIG. 2 is a perspective view of the present invention impact triggering mechanism attached to a mounting box which contains a conventional disposable panoramic camera.

Referring to FIG. 2, in the preferred embodiment, a disposable panoramic camera 4 slides into a mounting box 5, which may be made out of cardboard or any other suitable type of material, that is attached to the back of the rear-view mirror 6 and is open on a second end 11 of the mounting box 5, so that the disposable panoramic camera 4 may be removed for conventional usage. The impact triggering camera apparatus 1 may be attached to the rear-view mirror 6 with a double sticky tape, mating hook and loop fasteners such as VELCRO-R, magnets, clips or any other suitable attachment means. It is located on the back of the rear-view mirror 6 between the front windshield 3 and the rear-view mirror 6. This is an ideal place to mount the impact triggering camera apparatus 1 because it provides a good front view of a head on collision or any other type of collision. It is also out of the passengers' way and view. The disposable camera 4 will not hit the passenger in case of a head-on collision and it is located within easy access for manual operation by the driver or passenger. In the preferred embodiment, the impact triggering camera apparatus 1 comprises a disposable panoramic camera 4, an impact triggering mechanism 10 and a mounting box 5.

It will be appreciated that the present invention is not limited to the mounting position as described above. It is emphasized that while the rear-view mirror 6 is the preferred mounting position, it is also within the spirit and scope of the present invention to have a multiplicity of mounting positions including on the dashboard. In addition, it will not be too hard for one skilled in the art to mount the camera at different locations on the vehicle, including adjacent the rear window to be able to take a photograph of the situation in which the vehicle is rear-ended.

Figure 3:
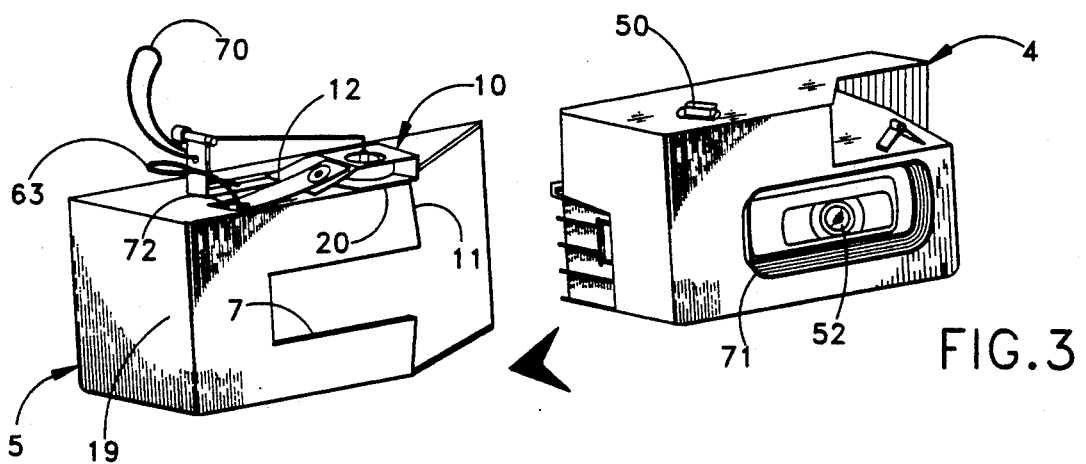
FIG. 3 is a perspective view of the present invention impact triggering mechanism attached to a mounting box and a conventional disposable panoramic camera detached from the mounting box.
Figure 4:
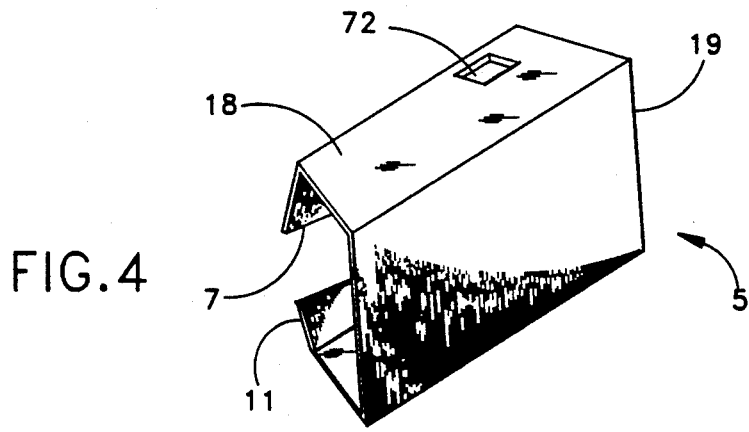
FIG. 4 is a perspective view of the mounting box without the impact triggering mechanism.

Referring to FIGS. 3 and 4, there is shown the impact triggering mechanism 10 mounted on the mounting box 5 which contains the disposable camera 4 with the camera 4 removed from the mounting box 5. The mounting box 5 has a first end 19 and a second end 11 with an opening to allow the disposable camera 4 to be easily removed for conventional operation. The mounting box 5 further has a slot 7 extending to the opening of the second end 11 for accommodating the lens opening 52 and the lens shield 71 of the disposable panoramic camera 4. A top aperture 72 is provided on the top surface 18 of the mounting box 5 to expose the camera 4 shutter release button 50. The bottom surface of the impact triggering mechanism frame 12 is seated on the top surface 18 of the mounting box 5. The camera 4 may be a conventional disposable camera which comprises a shutter release button 50, a lens shield 71, a lens opening 52, a means for retaining a roll of film, and a thumb wheel to manually advance the film after an exposure and set the shutter for the next shot. The camera 4 may also be a conventional electronic camera. In either case a panoramic camera with a wide angle lens is preferred to enhance the field of view. The mounting means 20 is adhesive or mechanical fasteners for securing the triggering mechanism frame 12 onto the top surface 18 of the mounting box 5. A safety tie 70 is provided which is adequate for attaching the impact trigger camera apparatus 1 securely to the vehicle in case of an impact.

Figure 5:
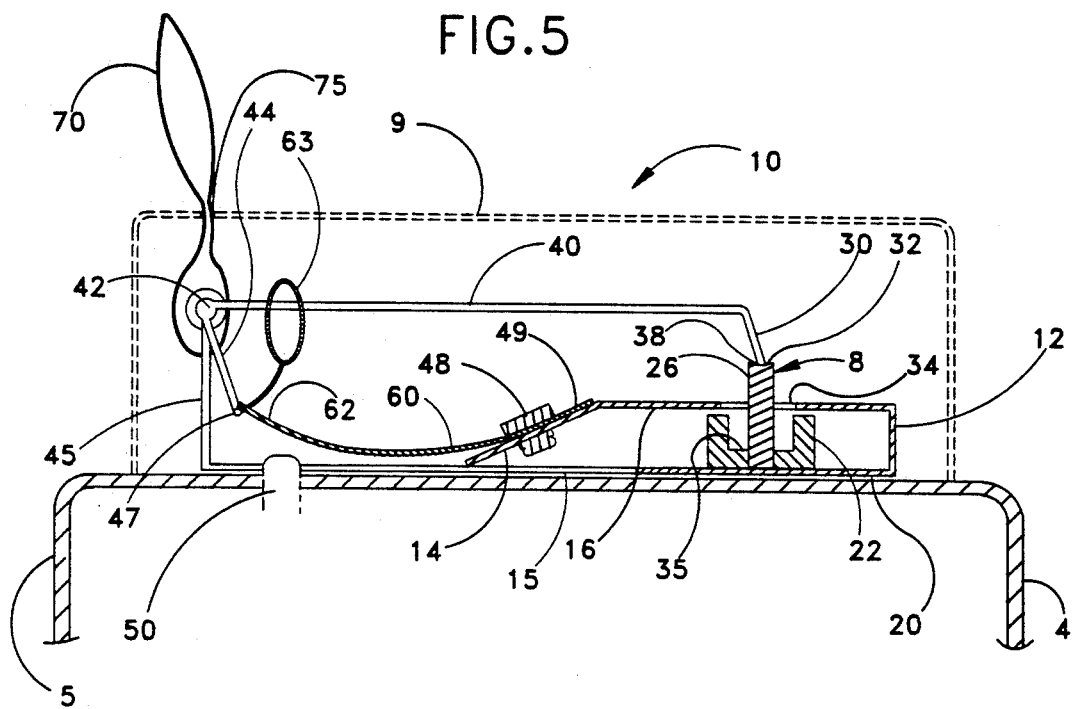
FIG. 5 is a partial cross-sectional view of the present invention impact triggering mechanism, taken along line 5—5 of FIG. 6.
Figure 6:
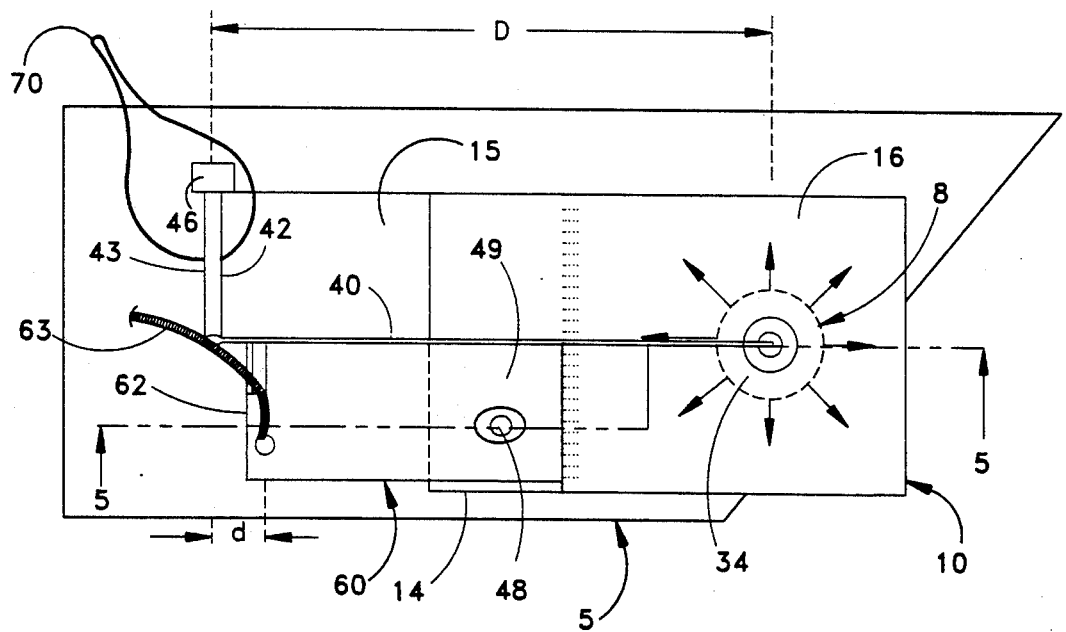
FIG. 6 is a top plan view of the present invention impact triggering mechanism.

Referring to FIGS. 5 and 6, there is shown the impact triggering mechanism 10. The deceleration or acceleration is associated with a sudden braking or impact. The impact is sensed by the sliding weight 8. The sliding weight 8 comprises a cylindrical weight disk 22 and a rod 26. The rod 26 is integrally connected to the cylindrical weight disk 22. The sliding weight 8 is configured so that the deceleration or acceleration applied in any direction in a horizontal plane will move the sliding weight 8. When the sliding weight 8 moves, the lever pin 30 slides off the top end 32 of the rod 26 of the sliding weight 8. An opening 34 is in the upper section 16 of the frame 12. The cylindrical weight disk 22 is sandwiched between the upper section 16 and the lower section 15 of the frame 12 with the rod 26 extending through the opening 34 of the upper section 16 of the frame 12 for retaining and limiting a horizonal plane movement of the sliding weight 8. The top of the cylindrical weight disk 22 of the sliding weight 8 may be counter bored 35 to accommodate the movement of the lever pin 30 when the sliding weight 8 slides. The top end 32 of the rod 26 is slightly concave so that the lever pin 30 will remain centered during small normal deceleration and further so that the lever pin 30 will not creep off due to the conditions of the road or vibrations.

The sensitivity and threshold deceleration for triggering the mechanism is adjustable by varying the cone angle of the concave top end 32 of the rod 26. The bottom tip 38 of the lever pin 30 is rounded to decrease friction. The sensitivity and threshold may also be varied by changing the sliding weight 8 or by varying the geometry of the lever or arm member 40, as will become apparent.

The lever pin 30 is integrally formed with the lever or arm member 40 which rotate together on a pivot shaft 42 to form a latching means 44 for preventing a cantilever spring 60 from pushing down on the shutter release button 50 of the camera 4. The pivot shaft 42 rotates in a bearing 43 integral with the upright section 45 of the frame 12. The pivot shaft 42 is held in position by the latching means 44 at a first end and by a collar 46 on the second end. The cantilever spring 60 is anchored with a mechanical fastener 48 at the fixed section 49 to the slope section 14 of the frame 12 which provides a preset force in the cantilever spring 60. The latching means 44 has a 90° bend and a horizontal pin 47 which strains the cantilever spring plate 60 by retaining it at the tip section 62 of the cantilever spring 60. The cantilever spring 60 may be either plate like with a rectangular cross section or a wire spring with a circular cross-section.

A wire or handle 63 is attached to the tip section 62 of the cantilever spring 60 to facilitate cocking of the lever or arm member 40. Cocking is accomplished by rotating the lever or arm member 40 clockwise off the top end 32 of the rod 26 of the sliding weight 8, raising the cantilever spring 60 with the attach wire or handle 63 until the tip section 62 of the cantilever spring 60 is above the horizontal pin 47 of the latching means 44, then rotating the lever or arm member 40 counterclockwise and positioning the lever pin 30 on the top end 32 of the rod 26 of the sliding weight 8.

The advantage of the cantilever spring 60 is that the lever or arm member 40 provides a much greater sensitivity. The result of conducting a moment balance on the lever or arm member 40 is that the pushing down force exerted by the lever pin 30 of the lever or arm member 40 on the sliding weight 8 is much less than the pushing down force exerted by the cantilever spring 60 on the latching means 44 of the lever or arm member 40. There is a force factor approximately equal to the ratio of the small horizontal distance "d" from the pivot shaft 42 to the horizontal latching pin 47 to the large horizontal distance "D" from the pivot shaft 42 to the lever or arm member 40 to the lever pin 30. This arrangement adequately balances the competing needs of, on one hand, a large force required on the cantilever spring 60 for effectively pushing down the shutter release button 50, and on the other hand, a small force required on the sliding weight 8 for sensitivity. A leverage factor of approximately one-tenth or less is readily achievable so that a weight force of several ounces will balance a spring force of several pounds.

Figure 7:
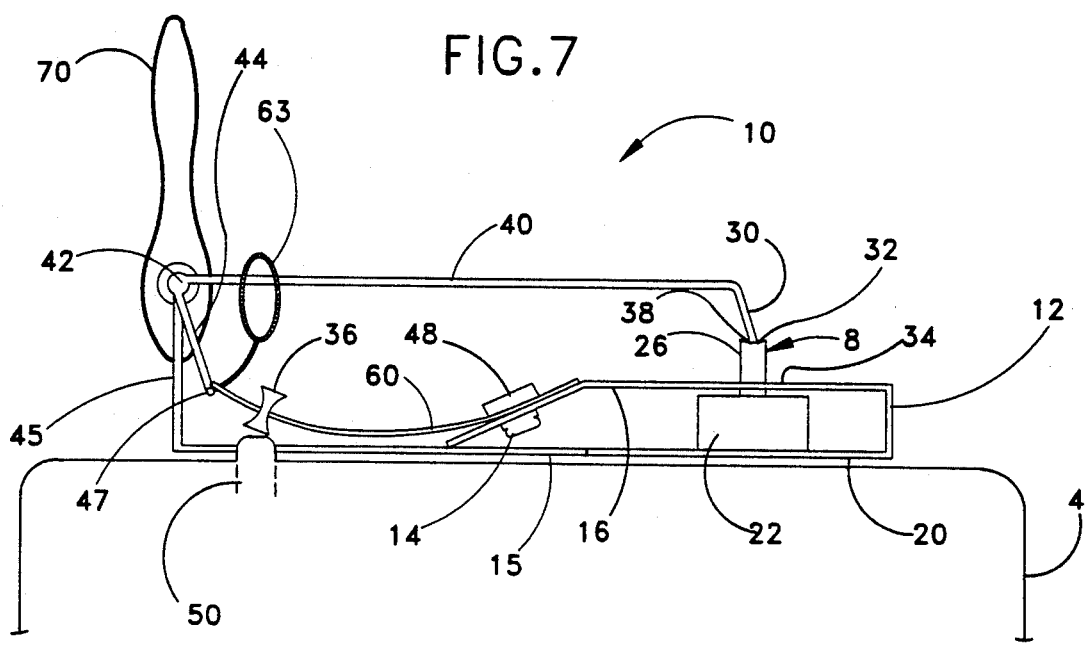
FIG. 7 is a side elevational view of the present invention impact triggering mechanism.

An important feature of the camera mounting and the impact triggering mechanism 10 is the ability to override the automatic impact triggering. In the preferred embodiment, the camera 4 is mounted in a mounting box 5 and the shutter may be released in one of two ways. First, the sliding weight 8 may be moved manually with the forefinger to actuate the impact triggering mechanism 10. Alternatively, the camera 4 may be removed from the mounting box 5 and triggered in the conventional way. An alternative mounting configuration is to attach the impact triggering mechanism 10 directly to the top surface of the camera 4 and attach the camera 4 directly to the vehicle with a removable fastener. In this case, it is convenient to provide a capability to operate the shutter release button 50 without disturbing the impact triggering mechanism 10 or removing the camera 4. This capability is provided by the optional manual release button 36, as shown in FIG. 7. FIG. 7 is an alternative embodiment with the manual release button 36 is seated on the shutter release button 50 and is loosely bound by the tip section 62 of cantilever spring 60 but can slide freely through a hole in the cantilever spring 60.

The mounting box 5 can be manufactured with or without a cover 9. The cover 9 can be a detachable transparent plastic material which encloses the impact triggering mechanism 10 and includes a means for mounting it onto the mounting box 5. The cover 9 has a hole 75 for slipping the safety tie 70 out from the impact triggering mechanism 10.

Another mounting application is a 360° panorama view so that the impacts from all directions can be recorded. There are various types of 360° panoramic cameras, some fixed and rotatable, but they are also expensive and have very distorted views. The concept is to use the inertia of the camera to point the camera toward the direction of impact. This can be accomplished by mounting the camera on a swivel behind the camera, so that the inertia of the camera causes the camera to swing around toward the impact.

Another application for the impact triggering mechanism is to record the sequence of events preceding an accident. This can be accomplished with a video or digital camera which records a given time interval and then overwrites the previous recording after some loop time. The continuous recording may be on a tape loop using a VCR or camcorder or a digital storage on computer chips. In this application, the impact triggering mechanism is used to stop the recording before it is erased within some delay time after the impact.

The present invention has many advantageous features including: (a) it provides an instant documentation of a vehicle collision; (b) it is inexpensive to manufacture; and (c) it can be used with conventional or low cost disposable panoramic cameras.

Defined in detail, the present invention is an impact triggering camera apparatus removably mounted inside a vehicle at a location between a back of a rear-view mirror and a front windshield for taking a photographic picture, the impact triggering camera apparatus comprising: (a) a disposable panoramic camera apparatus having a shutter release button, a panorama lens, means for retaining a roll of film and means to advance the roll of film after an exposure and set the shutter for a next shot; (b) a mounting box having a top surface, a bottom surface, a front panel, a rear panel, a first end and a second end with an opening; (c) a slot centrally located on said front panel of said mounting box extending to said opening of said second end for accommodating said panorama lens of said disposable panoramic camera when said disposable panoramic camera slides into said opening of said second end; (d) a top aperture on said top surface of said mounting box which is centrally located between said front and rear panels of said mounting box for accessing said shutter release button through the top aperture; (e) means for mounting said mounting box to said back of said rear-view mirror of said vehicle; (f) an impact triggering device having a frame which has an upper section, a lower section, a slope section and an upright section, the upper section having an opening located remote from said shutter release button of said disposable panoramic camera, the lower section affixed to said top surface of said mounting box; (g) said impact triggering device further comprising a sliding weight which is responsive to inertial forces and has a cylindrical weight disk, the cylindrical weight disk having a counter bored top which is integrally connected by a rod having a concave top, the cylindrical weight disk sandwiched between said upper and lower sections of said frame with the rod extending through said opening of said upper section of said frame for retaining and limiting a horizontal plane movement of the sliding weight; (h) said impact triggering device further comprising a pivot shaft mounted to said upright section of said frame at a location remote from said sliding weight and a lever member supported by the pivot shaft; (i) said lever member having a first end forming a lever pin resting on said concave top of said rod and a second end affixed to said pivot shaft and forming a latching means; (j) a cantilever spring plate having a tip section and a fixed section, the fixed section affixed to said slope section of said frame and the tip section engagable with said latching means of said lever member; and (k) a handle member attached to said tip section of said cantilever spring plate to facilitate the cocking of said tip section to said latching means of said lever, said latching means of said lever member latching said tip section of said cantilever spring plate for preventing said tip section of said cantilever spring plate from pushing down on said shutter release button of said disposable panoramic camera; (l) whereby when said impact triggering camera apparatus is mounted in said vehicle, said sliding weight can move in response to said inertial forces on said horizontal plane upon sudden impact on said vehicle from any direction, which drops said lever pin of said lever member off from said concave top of said rod of said sliding weight, causing said latching means of said lever member to release said tip section of said cantilever spring plate which in turn presses down on said shutter release button of said disposable panoramic camera, to thereby automatically take said photographic picture at the moment of sudden impact.

Defined broadly, the present invention is an impact triggering device for use with a camera which has a shutter button and is removably mounted inside a vehicle for taking a photographic picture, the impact triggering device comprising: (a) a frame having a top section, a bottom section, a ramp section and an upright section, the top section having an opening located remote from said shutter button of said camera and the bottom section affixed to said camera; (b) a sliding weight which is responsive to inertial forces and has a disk integrally connected by a rod, the disk sandwiched between said top and bottom sections of said frame with the rod extending through said opening of said top section for retaining and limiting a horizontal plane movement of the sliding weight; (c) a pivot rod mounted to said upright section of said frame at a location remote from said sliding weight and a lever member supported by the pivot rod; (d) said lever member having a first end forming a lever pin resting on said rod and a second end affixed to said pivot rod and forming a latching means; (e) a cantilever spring having a first end and a second end, the first end affixed to said ramp section of said frame; and (f) a handle attached to said second end of said cantilever spring to facilitate the cocking of said second end to said latching means of said lever member, said latching means of said lever member latching said second end of said cantilever spring for preventing said second end of said cantilever spring from pushing down on said shutter button of said camera; (g) whereby when said camera is mounted in said vehicle, said sliding weight can move in response to said inertial forces on said horizontal plane upon sudden impact on said vehicle from any direction, which drops said lever pin of said lever member off from said rod of said sliding weight, causing said latching means of said lever member to release said second end of said cantilever spring which in turn presses down on said shutter button of said camera, to thereby automatically take said photographic picture at the moment of sudden impact.

Defined more broadly, the present invention is an impact triggering mechanism for use with a photographic device which has an operation button for controlling operation and is mounted inside a vehicle, the impact triggering mechanism comprising: (a) a frame having an opening; (b) a sliding mass which is responsive to inertial forces and is located within said opening of said frame; (c) a spring member; (d) a pivoting arm member having a lever end engagable with said sliding mass and a latch end engagable with said spring member for preventing said spring member from pushing down on said operation button of said photographic device; and (e) means for mounting said impact triggering mechanism to said photographic device; (f) whereby when said photographic device is mounted in said vehicle, said sliding mass can move in response to said inertial forces upon sudden impact on said vehicle from any direction, which drops said lever end of said pivoting arm member off from said sliding mass, causing said latch end of said pivoting arm member to release said spring member which in turn presses down on said operation button of said photographic device at the moment of sudden impact.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An impact triggering camera apparatus removably mounted inside a vehicle at a location between a back of a rear-view mirror and a front windshield for taking a photographic picture, the impact triggering camera apparatus comprising:
  a. a disposable panoramic camera apparatus having a shutter release button, a panorama lens, means for retaining a roll of film and means to advance the roll of film after an exposure and set the shutter for a next shot;
  b. a mounting box having a top surface, a bottom surface, a front panel, a rear panel, a first end and a second end with an opening;
  c. a slot centrally located on said front panel of said mounting box extending to said opening of said second end for accommodating said panorama lens of said disposable panoramic camera when said disposable panoramic camera slides into said opening of said second end;
  d. a top aperture on said top surface of said mounting box which is centrally located between said front and rear panels of said mounting box for accessing said shutter release button through the top aperture;
  e. means for mounting said mounting box to said back of said rear-view mirror of said vehicle;

f. an impact triggering device having a frame which has an upper section, a lower section, a slope section and an upright section, the upper section having an opening located remote from said shutter release button of said disposable panoramic camera, the lower section affixed to said top surface of said mounting box;

g. said impact triggering device further comprising a sliding weight which is responsive to inertial forces and has a cylindrical weight disk, the cylindrical weight disk having a counter bored top which is integrally connected by a rod having a concave top, the cylindrical weight disk sandwiched between said upper and lower sections of said frame with the rod extending through said opening of said upper section of said frame for retaining and limiting a horizontal plane movement of the sliding weight;

h. said impact triggering device further comprising a pivot shaft mounted to said upright section of said frame at a location remote from said sliding weight and a lever member supported by the pivot shaft;

i. said lever member having a first end forming a lever pin resting on said concave top of said rod and a second end affixed to said pivot shaft and forming a latching means;

j. a cantilever spring plate having a tip section and a fixed section, the fixed section affixed to said slope section of said frame and the tip section engagable with said latching means of said lever member; and k. a handle member attached to said tip section of said cantilever spring plate to facilitate the cocking of said tip section to said latching means of said lever, said latching means of said lever member latching said tip section of said cantilever spring plate for preventing said tip section of said cantilever spring plate from pushing down on said shutter release button of said disposable panoramic camera;

l. whereby when said impact triggering camera apparatus is mounted in said vehicle, said sliding weight can move in response to said inertial forces on said horizontal plane upon sudden impact on said vehicle from any direction, which drops said lever pin of said lever member off from said concave top of said rod of said sliding weight, causing said latching means of said lever member to release said tip section of said cantilever spring plate which in turn presses down on said shutter release button of said disposable panoramic camera, to thereby automatically take said photographic picture at the moment of sudden impact.

2. The invention as defined in claim 1 wherein said impact triggering device has a sensitivity adjustable by means of changing a cone angle of said concave top of said rod.

3. The invention as defined in claim 1 wherein said impact triggering device has a sensitivity adjustable by means of changing said sliding weight.

4. The invention as defined in claim 1 wherein said impact triggering device has a sensitivity adjustable by means of changing said lever member dimensions.

5. The invention as defined in claim 1 wherein said disposable panoramic camera can readily removed from said mounting box for conventional manual operation.

6. The invention as defined in claim 1 wherein said impact triggering device can be triggered insitu by moving said sliding weight with a finger.

7. The invention as defined in claim 1 wherein said means for mounting said mounting box and said disposable panoramic camera to said back of said rear-view mirror of said vehicle is a safety tie.

8. The invention as defined in claim 1 further comprising a transparent cover attached to said top surface of said mounting box for enclosing said impact triggering device.

9. An impact triggering device for use with a camera which has a shutter button and is removably mounted inside a vehicle for taking a photographic picture, the impact triggering device comprising:

a. a frame having a top section, a bottom section, a ramp section and an upright section, the top section having an opening located remote from said shutter button of said camera and the bottom section affixed to said camera;

b. a sliding weight which is responsive to inertial forces and has a disk integrally connected by a rod, the disk sandwiched between said top and bottom sections of said frame with the rod extending through said opening of said top section for retaining and limiting a horizontal plane movement of the sliding weight;

c. a pivot rod mounted to said upright section of said frame at a location remote from said sliding weight and a lever member supported by the pivot rod;

d. said lever member having a first end forming a lever pin resting on said rod and a second end affixed to said pivot rod and forming a latching means;

e. a cantilever spring having a first end and a second end, the first end affixed to said ramp section of said frame; and f. a handle attached to said second end of said cantilever spring to facilitate the cocking of said second end to said latching means of said lever member, said latching means of said lever member latching said second end of said cantilever spring for preventing said second end of said cantilever spring from pushing down on said shutter button of said camera;

g. whereby when said camera is mounted in said vehicle, said sliding weight can move in response to said inertial forces on said horizontal plane upon sudden impact on said vehicle from any direction, which drops said lever pin of said lever member off from said rod of said sliding weight, causing said latching means of said lever member to release said second end of said cantilever spring which in turn presses down on said shutter button of said camera, to thereby automatically take said photographic picture at the moment of sudden impact.

10. The invention as defined in claim 9 wherein said camera is mounted to a rear-view mirror of said vehicle by a safety tie.

11. The invention as defined in claim 9 wherein said impact triggering device can be manually overridden by manually moving said rod of said sliding weight away from said lever pin of said lever member.

12. The invention as defined in claim 9 wherein said camera is mounted directly to said vehicle with a bracket.

13. The invention as defined in claim 9 wherein said camera can be removed for manual use.

14. The invention as defined in claim 9 wherein said cantilever spring is a plate with a rectangular cross-section.

15. The invention as defined in claim 9 wherein said cantilever spring is a wire with a circular cross-section.

16. An impact triggering mechanism for use with a photographic device which has an operation button for controlling operation and is mounted inside a vehicle, the impact triggering mechanism comprising:
 a. a frame having an opening;
 b. a sliding mass which is responsive to inertial forces and is located within said opening of said frame;
 c. a spring member;
 d. a pivoting arm member having a lever end engagable with said sliding mass and a latch end engagable with said spring member for preventing said spring member from pushing down on said operation button of said photographic device; and
 e. means for mounting said impact triggering mechanism to said photographic device;
 f. whereby when said photographic device is mounted in said vehicle, said sliding mass can move in response to said inertial forces upon sudden impact on said vehicle from any direction, which drops said lever end of said pivoting arm member off from said sliding mass, causing said latch end of said pivoting arm member to release said spring member which in turn presses down on said operation button of said photographic device at the moment of sudden impact.

17. The invention as defined in claim 16 wherein said photographic device is mounted to a rear-view mirror of said vehicle.

18. The invention as defined in claim 16 wherein said photographic device is a disposable camera.

19. The invention as defined in claim 16 wherein said photographic device is a continuous video recorder.

20. The invention as defined in claim 16 wherein said photographic device is a panoramic camera.

21. The invention as defined in claim 16 wherein said photographic device is an electronic camera.

22. The invention as defined in claim 16 wherein said photographic device is a digital camera.

23. The invention as defined in claim 16 wherein said photographic device is turn-off by said impact triggering mechanism after some selected time delay.

24. The invention as defined in claim 16 wherein said photographic device is mounted in front of a swivel so that said inertial forces swings said photographic device toward a direction of impact.

* * * * *